United States Patent [19]

Diehm

[11] Patent Number: 4,890,443
[45] Date of Patent: Jan. 2, 1990

[54] PLASTIC SHEET FEED ATTACHMENT FOR ROUND BALER

[76] Inventor: Martin R. Diehm, Rte. 1, Box 93, Red Rock, Okla. 74651

[21] Appl. No.: 229,711

[22] Filed: Sep. 26, 1988

[51] Int. Cl.⁴ ............................................. B65B 11/04
[52] U.S. Cl. ......................................... 53/118; 53/587; 53/399
[58] Field of Search .......................... 53/399, 118, 587; 100/13

[56] References Cited

U.S. PATENT DOCUMENTS 4,563,854  1/1986  Ackerman ............................. 53/587
4,677,807  7/1987  Verhulst .................................. 53/118

FOREIGN PATENT DOCUMENTS 2705101  8/1978  Fed. Rep. of Germany ......... 53/118

Primary Examiner—John Sipos
Attorney, Agent, or Firm—William S. Dorman

[57] ABSTRACT

A device for wrapping plastic sheet material around the surface of a round bale of hay. The device is in the form of an attachment for an existing hay baler of the type which is capable of scooping up cut hay and wrapping it into round bales. The attachment of the present invention includes a table mounted at the forward end of the baler, a carriage slidably mounted on the table and movable from side to side across the width of the baler, a cartridge containing a length of plastic sheet material mounted on the carriage, and a plastic sheet guide pivotally mounted at the outer end of the pre-existing twine arm. The carriage is movable from side to side across the table in synchronism with the movement of the twine arm.

4 Claims, 5 Drawing Sheets

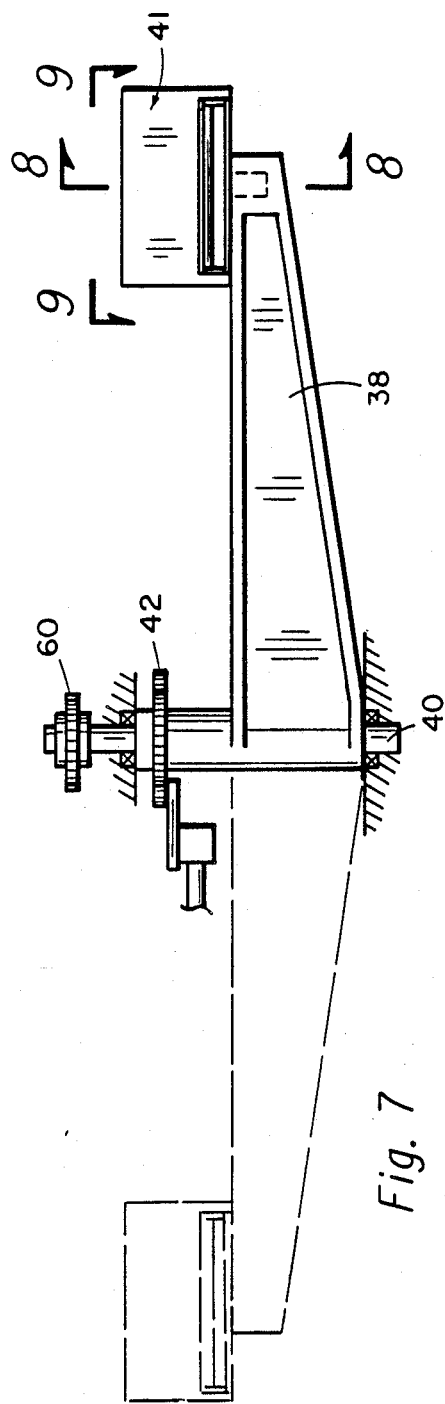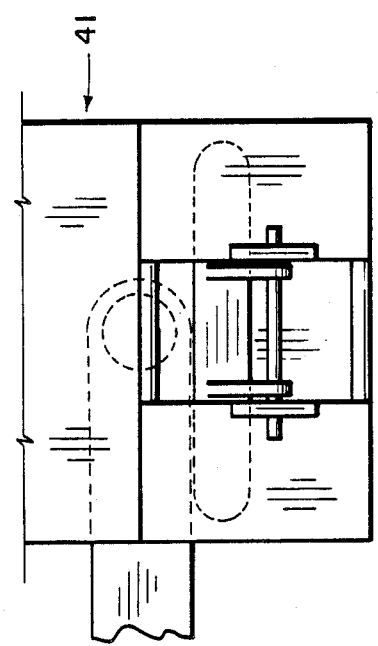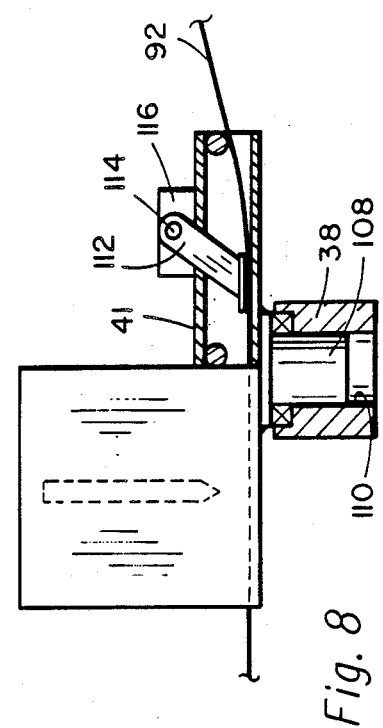

PLASTIC SHEET FEED ATTACHMENT FOR ROUND BALER

BACKGROUND OF THE INVENTION

1. Field of the Invention

The present invention relates to relates to a machine for making round bales of hay. More particularly, this invention relates to an attachment for such a machine whereby plastic sheet material may be wrapped around the bale.

2. The Prior Art

There are numerous machines on the market today which are capable of scooping up cut hay and wrapping it in round bales and then, after the full bale has been formed, depositing the round bale on the ground for later consumption by cattle. One of the problems in this art, however, is that the round bales of hay can get wet after which the wet bales, being exposed to the heat, can rot or deteriorate. Therefore, it is a purpose of this invention to provide a plastic wrapping for the round bales to prevent the bales from becoming wet. Applicant is aware of the following U.S. Patents:

| U.S. PAT. NO. | PATENTEE | ISSUE DATE |
| --- | --- | --- |
| 4,409,776 | Usui | October 18, 1983 |
| 4,514,969 | Moosbrucker et al. | May 7, 1985 |
| 4,563,854 | Ackermann et al. | January 14, 1986 |
| 4,580,398 | Bruer et al. | April 8, 1986 |
| 4,599,844 | Clostermeyer et al. | July 15, 1986 |
| 4,604,855 | Krone et al. | August 12, 1986 |
| 4,610,123 | Krone et al. | September 9, 1986 |

None of the above patents disclose the feature of the present invention; that is these patents do not disclose the feature of feeding a plastic material into a bale making machine wherein the plastic sheet material serves the purpose of tieing the bale together in a round form and also at the same time providing a plastic covering over the entire circumference of the bale. In the present invention the plastic sheet material is wrapped around the bale in much the same manner that line is wound on a fishing reel, from side to side.

SUMMARY OF THE INVENTION

The present invention involves an attachment to a round hay baler generally of the type manufactured by John Deere, Models 430 and 530. Complete details of the operation of the John Deere baler is unnecessary for an understanding of the present invention. Suffice it to say that the baler to which the present invention is attached is capable of picking up hay and rolling it into a round form. In the particular John Deere round baler to which the present invention is attached, a device senses the formation of the round bale in terms of its increasing diameter. When the diameter reaches a first predetermined value, the twine wrapping device is actuated. When the bale reaches a second predetermined and ultimate diameter, the twine is automatically cut and thereafter the bale can be dumped from the machine.

The present invention is particularly designed to operate in conjunction with the conventional twine wrapping apparatus used on the John Deere baler. The John Deere twine wrapping device consists essentially of an arm which pivots in front of the bale as it is being wound. The arm moves from side to side, in the same manner that the feed on a fishing reel moves the line from side to side as the line is being wound on the reel. At one end of the arm on the Deere baler, there is a round piece of pipe through which twine is passed. After the baler completes one operation and the twine is cut, there remains a piece of twine hanging out the end of the pipe so that, when the twine arm is actuated in response to the next bale reaching the first predetermined diameter, the arm will swing towards the bale being wound until the piece of twine hanging out of the pipe is grabbed by the rotating bale of hay. As the arm proceeds to rotate or pivot thereafter from side to side, the twine will be wound in and around the round bale.

The attachment of the present invention is placed on the forward end of the John Deere machine. The twine itself is eliminated; in fact, the pipe on the end of the "twine" arm is removed. Instead of a pipe being mounted on the outer end of the "twine" arm, applicant proposes to place a guide for the plastic sheet material which is feed into and around the bale in much the same fashion as the twine was previously. The present invention also includes an elongated horizontal table which is mounted on the front of the baler and which extends essentially for the full width of the baler. A plastic supply cartridge or container is mounted on a carriage which is movable from side to side across the table as the "twine" arm pivots from side to side. Sheet material is fed out of the top of the plastic sheet cartridge over the front of the baler and through the guide which is mounted on the end of the twine arm.

The operation of the baler with applicant's attachment will be essentially the same as with the twine. That is, a piece of plastic material (severed from the prior operation) will be projecting outwardly from the guide on the end of the "twine" arm. (Hereinafter, the "twine" arm which no longer supplies twine will still be referred to as the twine arm.) As the device automatically sense the size of the bale and actuates the twine arm, the twine arm will pivot to the central position in front of the thus forming bale of hay at which time the exposed piece of plastic sheeting will be picked up by the thus forming bale and will be pulled into the bale as it is wound. Thereafter, the twine arm will rotate from side to side and the plastic sheet material will be wrapped around the outside of the bale. When the bale reaches the ultimate predetermined diameter, the twine arm will come to rest in its extreme position adjacent the cutter and the cutter will be thereafter actuated to cut-off the plastic material. In the case of the present invention, the cutter blade will be wider so as sever the entire width of the plastic sheet material.

BRIEF DESCRIPTION OF THE DRAWINGS

FIG. 7 is a view taken along section line 7—7 of FIG. 4 and showing the internal "twine" arm of the hay baler with applicant's sheet guide attached;

FIG. 8 is a vertical sectional view taken along section line 8—8 of FIG. 7;

FIG. 9 is a plan view of the sheet guide of FIG. 7 looking along line 9—9; and

DETAILED DESCRIPTION OF THE PREFERRED EMBODIMENTS

Figure 1:
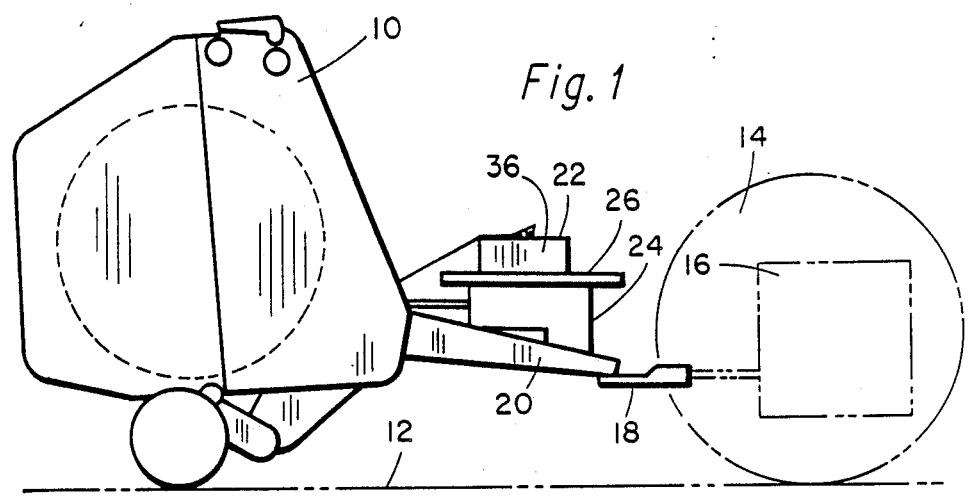
FIG. 1 is a side elevation of the hay baler to which the present invention is attached, this figure showing the rear end of a tractor in phantom.

Referring to the drawings in detail, FIG. 1 shows a conventional hay baler 10 for making round bales of hay. The baler is adapted to be drawn over the surface of the ground 12 by means of a tractor 14, only the rear wheels of which are shown along with a box portion 16 representing that portion of the tractor to which a draw bar 18 is connected. The draw bar 18 of the tractor 14 connects with a tow bar 20 on the baler 10. Above the tow bar portion 20 of the baler 10 is mounted the device 22 of the present invention. A housing or supporting structure 24 is mounted on the tow bar 20 and supports a table 26 and a plastic sheet cartridge 36.

Figure 10:
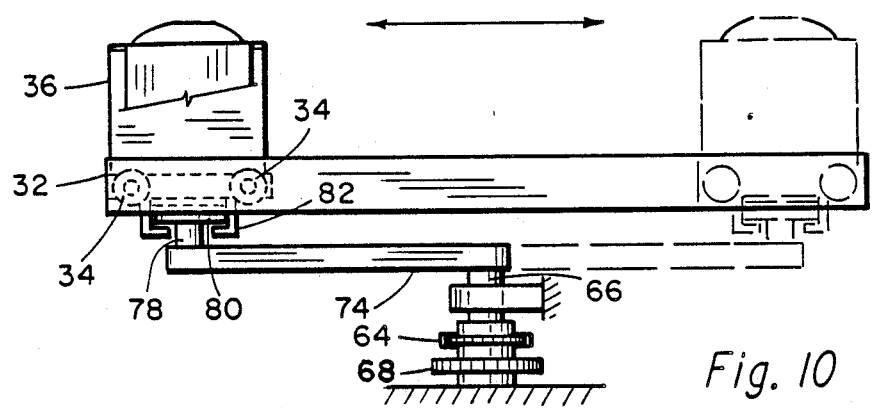
FIG. 10 is a view taken along section line 10—10 of the FIG. 4.
Figure 2:
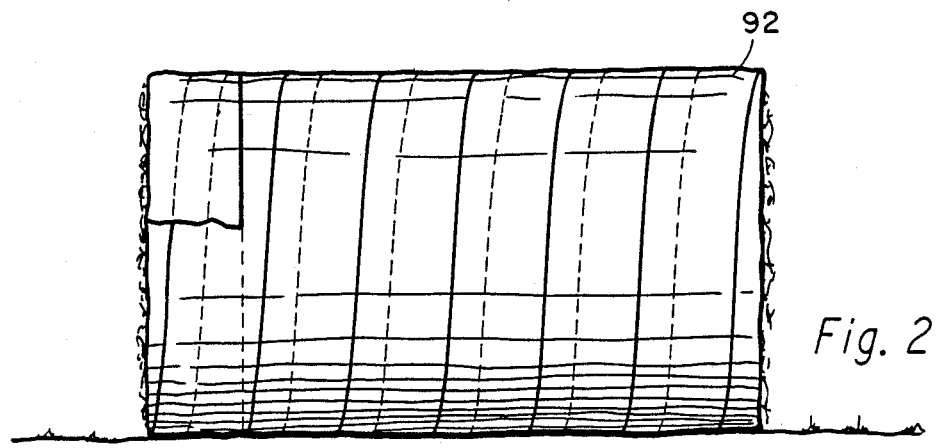
FIG. 2 is a front elevation of a bale of hay which has been wrapped with plastic sheet material in accordance with the present invention.
Figure 3:
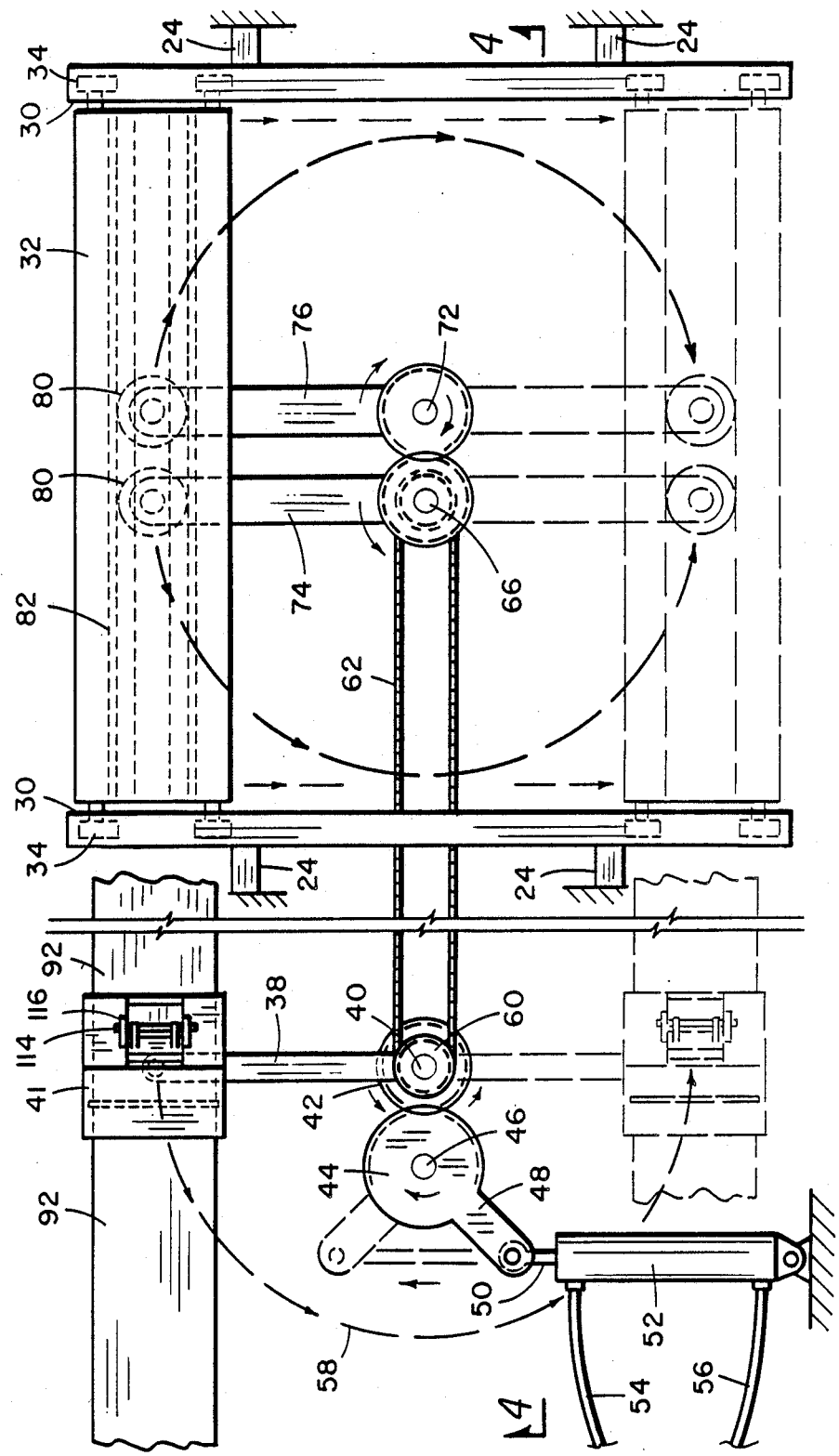
FIG. 3 is a plan view of the plastic sheet cartridge and associated carriage of the present invention shown in association with certain internal portions of the hay baler.
Figure 4:
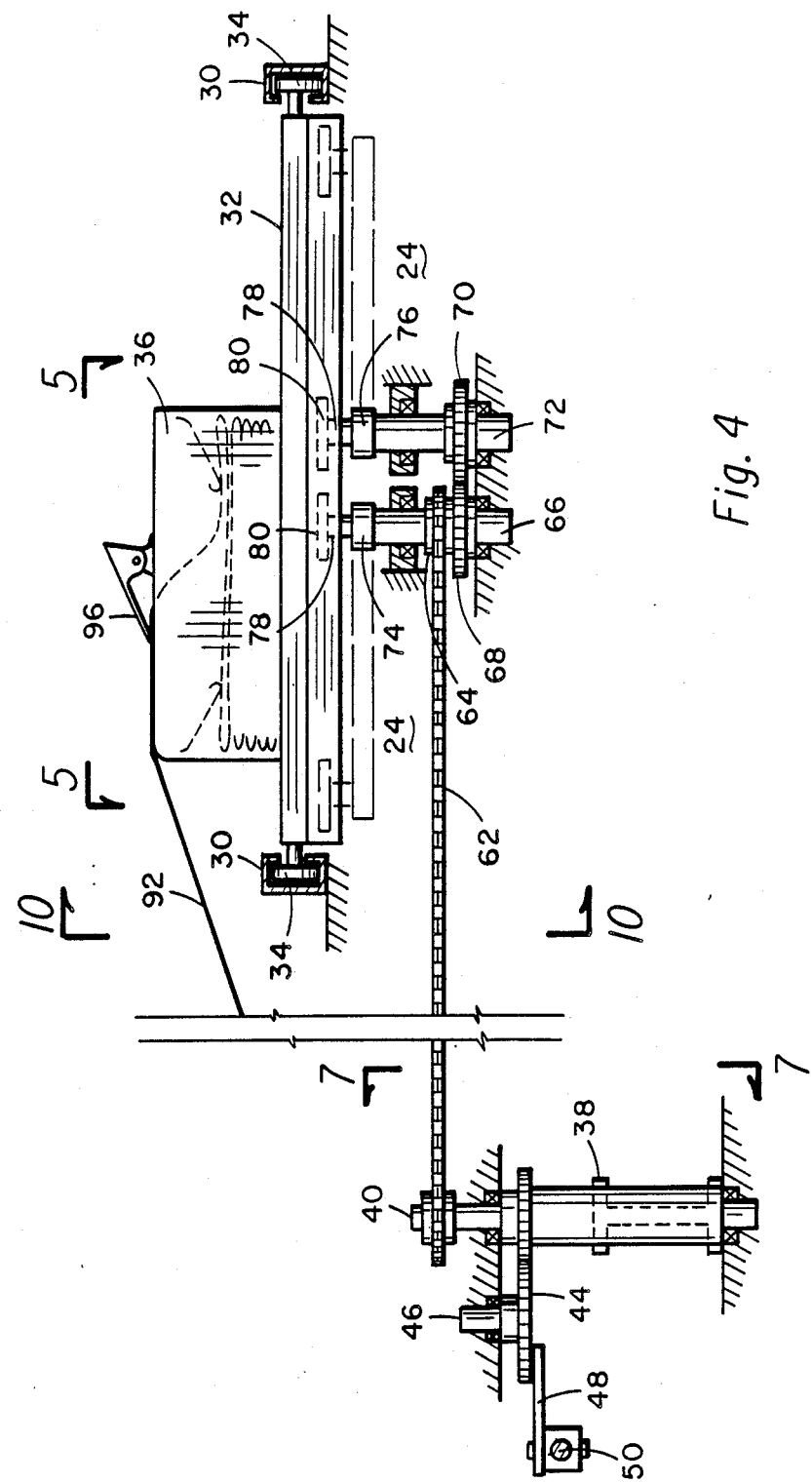
FIG. 4 is a view taken along section line 4—4 of FIG. 3.
Figure 5:
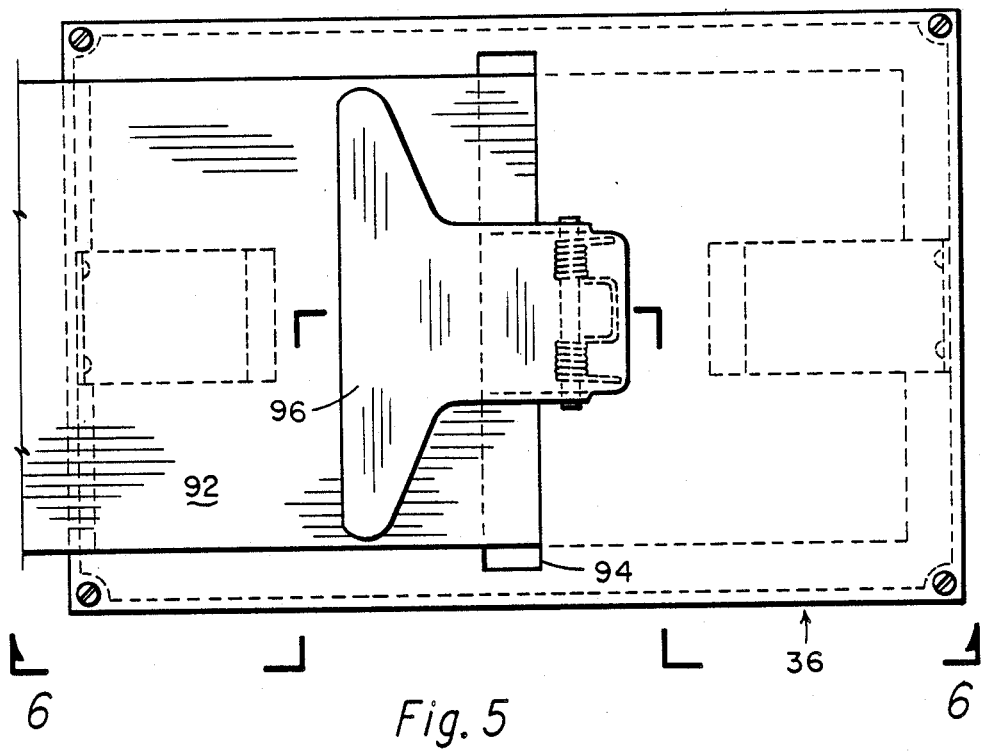
FIG. 5 is a plan view of the plastic sheet cartridge per se as it would appear looking along line 5—5 of FIG. 4.

The table 26 rests on the housing 24, the latter being connected in any convenient manner to the draw bar 20; hence, the housing 24 is merely diagrammatically illustrated in FIG. 3. At any event, table 26 is provided with a pair of tracks 30 in which a carriage 32 is slidably mounted by means of a pair of rollers 34 at each end of the carriage. As shown in FIGS. 4 and 10, the plastic sheet cartridge 36 is mounted on the carriage 32.

As shown in FIGS. 3, 4, and 7 the conventional "twine" arm 38 is mounted internally in the forward portion of the baler 10. This would be at the right-hand portion internally of the baler 10 as it appears in FIG. 1. At first, it should be understood that the "twine" arm is no longer used to dispense twine; in fact, the round piece of pipe which is normally found on this twine arm has been eliminated and a plastic sheet guide 41 (the details of which will appear hereafter) is pivotly attached to the twine arm 38. This conventional twine arm 38 rotates around a shaft 40 by virtue of a gear 42 which is keyed to the shaft 40 and which meshes with a gear 44 mounted on a shaft 46. One part of the gear 44 is connected to an arm 48 which, in turn, is connected to the outer end of a piston rod 50. The piston rod 50 reciprocates within a pneumatic cylinder 52 which is feed by hydraulic lines 54 and 56. The conventional operation of the hay baler (without applicant's attachment) is such that the action of the cylinder 52 is initiated when the growing bale of hay within the hay baler 10 reaches a predetermined size, at which time the hydraulic system (not shown) is actuated to cause the piston rod to reciprocate, moving the arm 38 in an arc generally designated by the reference character 58. At the approximate center of the arc 58, the twine (not shown) which was previously associated with the arm 38 would be grabbed by the growing bale of hay and be wound thereof as the hay continued to grow to its full predetermined size after which the arm 38 would return to its upper position (as shown in FIG. 3) and at which time a knife blade (not shown) would be actuated automatically to cut the projecting end of the twine.

In order to operate the mechanism of the present invention, a sprocket 60 is placed on top of the shaft 40 which turns the arm 38; in fact it may be necessary to extend the shaft 40 upwardly to accommodate the sprocket 60. At any event, a chain 62 goes around the sprocket 60 and also goes around another sprocket 64 located within the attachment of the present invention and being keyed to a shaft 66 located within the housing 24. A gear 68 keyed the shaft 66 meshes with an identical gear 70 keyed to a shaft 72. The upper ends of the shafts 66 and 72 connect with arms 74 and 76, respectively. The outer ends of the arms 74 and 76 are provided with vertical posts 78 which support rollers 80 at the upper ends thereof. The rollers are adapted to ride in a track 82 located at the underside of the carriage 32.

As the shaft 40 of "twine" arm 38 moves in a counter-clockwise direction (with respect to FIG. 3) and the twine arm 38 moves in the direction shown by the arrow 58, the gear 68 will also move in a counter-clockwise direction so as to move the arm 74 in a counter-clockwise direction; however, when the gear 66 moves in a counter-clockwise direction, the gear 72 will move in a clockwise direction thereby causing the arm 76 to move in a clockwise direction. The combined movement of the two arms 74 and 76 in mutually different directions will cause the carriage 32 to move downwardly (as it appears in FIG. 3) so as to move in coordination with the movement of the outer end of the arm 38.

Figure 6:
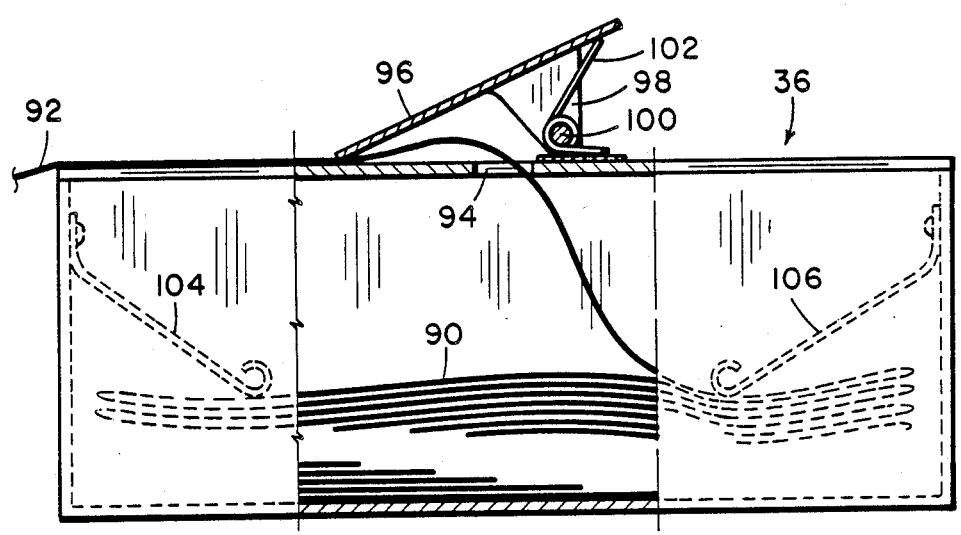
FIG. 6 is a side elevation, partly in section and with portions broken away, of the plastic sheet cartridge looking along line 6—6 of FIG. 5.

The cartridge 36 for the plastic sheet material is shown in FIG. 4, 5, 6 and 10. It has been discovered that the supplying of sheet material in roll form makes it somewhat difficult to handle due to the inertia of the rolls. Therefore, the cartridge 36 contains a quantity of plastic sheet material 90 which has been previously arranged in layers, in serpentine fashion, so as to correspond with the width and length of the interior of the cartridge 36. The outer end 92 of the plastic sheet material 90 feeds through an opening 94 in the cartridge 36. A spring-urged clip or flap 96 is mounted above the opening 94 and is adapted to bear, at least lightly, against the end 92 of the plastic material 90 so as to prevent overdraw of the plastic material when the cutting operation ceases the need for a supply of the same. The flap 96 also prevents the return of material into the cartridge when the operation ceases. The clip 96 is provided with a pair of side members 98 which are mounted on a shaft 100. A coiled spring 102, which is also mounted the shaft 100, urges the outer end of the clip 96 downwardly against the plastic material as shown in FIG. 6. In the interior of the cartridge 36 are a pair of leaf springs 104 and 106 which are adapted to hold the supply of plastic material 90 against the bottom of the cartridge 36.

As shown in FIGS. 3 and 8, the sheet material 92 is fed into a sheet guide 41 which is pivotly mounted at the end of the "twine" arm 38. The lower arm of the guide 41 is provided with a shaft 108 which is received in a hole 110 in the arm 38. The sheet material 92 passes through the guide 41 and under a foot 112 which is lightly weighted and which is pivotally mounted at its upper end on a shaft 114 which passes through a pair of ears 116. As was the case with the flap 96, the foot 112 prevents overdraw of the plastic material and, at the same time, prevents return or backup of the material in a reverse direction through the guide.

Whereas the present invention has been described in particular relation to the drawings attached hereto, other and further modifications apart from those and suggested herein maybe made within the spirit and scope of this invention.

What is claimed is:

1. In a hay baler of the type adapted to be drawn over the surface of the ground so as to scoop up cut hay from the surface of the ground, means within the hay baler to form a round bale of hay of continuously increasing diameter as the hay baler progresses over the ground, wherein the hay baler is provided with an arm, means to pivot said arm from one side of the baler to the other in a forward portion of the baler and forward of the growing round bale of hay being formed within the baler and wherein the baler is provided with a sensing means responsive to the growth of round bale of hay to a first predetermined diameter to initiate the pivotal action of the arm such that the arm moves from a position of rest at one side of the baler towards a second position at the opposite side of the baler and wherein the baler is provided with means responsive to the growth of the round bale of hay to a second predetermined diameter to actuate a cutter when the arm next thereafter reaches its position of rest; the improvement which comprises a housing mounted on the forward portion of the baler, a table resting on the housing and extending horizontally across the width of the baler, said table being provided with a pair of spaced horizontal tracks extending transversely across the table at right angles to the direction of movement of the baler, a carriage mounted on the table and slidably movable in the tracks from one side of the tables to the other, a cartridge containing a length of plastic sheet material mounted on the carriage, a plastic sheet guide pivotally mounted at the outer end of the arm opposite from its pivotal end, and means for moving the carriage from side to side across the table in synchronism with the movement of the arm whereby plastic sheet material can be fed from the carriage to and through the plastic sheet guide such that a piece thereof is disposed in trailing relation with respect to the end of the arm and whereby, when the pivotal movement of the arm is initiated by the sensing means within the hay baler, the arm will proceed to pivot from side to side and whereby the trailing end of the plastic material held by said sheet guide will be grasped by the growing bale of hay as the guide passes in close proximity to the growing bale to wrap the sheet material around the bale as the bale increases in diameter within the baler until the bale reaches its second pre-determined diameter at which time the arm will be returned to its position of rest and the cutter will sever the end of the plastic sheet material.

2. The improvement according to claim 1 wherein the carriage is slidable mounted in the tracks by means of a pair of rollers at each end of the carriage.

3. The improvement according to claim 1 wherein the plastic sheet material is fed through an opening at the top of the cartridge and wherein a clamp bears lightly against the sheet of plastic material to prevent the return of plastic material into the cartridge.

4. The improvement according to claim 1 wherein the guide means is provided with a pivotal foot which lightly bears against the plastic sheet material permitting the plastic material to be drawn towards the bale of hay but preventing the plastic material from moving in the opposite direction.

* * * * *